United States Patent [19]

Opanasenko

[11] Patent Number: 4,485,526
[45] Date of Patent: Dec. 4, 1984

[54] FISH SCALING APPARATUS

[76] Inventor: Walter W. Opanasenko, 486 2nd St., Bay Port, Mich. 48720

[21] Appl. No.: 406,299

[22] Filed: Aug. 9, 1982

[51] Int. Cl.³ ............................................. A22C 25/02
[52] U.S. Cl. ........................................... 17/64; 17/74
[58] Field of Search .................. 17/64, 65, 53, 73, 74; 99/630, 629

[56] References Cited

U.S. PATENT DOCUMENTS

| | | | |
|---|---|---|---|
| 753,722 | 3/1904 | Manula et al. | 17/65 |
| 1,064,558 | 6/1913 | Smith et al. | 99/630 |
| 1,383,162 | 6/1921 | Sprague | 17/64 |
| 1,565,365 | 12/1925 | Hidzick | 17/65 |
| 1,886,061 | 11/1932 | Speidel | 99/630 |
| 2,058,560 | 10/1936 | Brandstrom | 99/630 X |
| 2,331,855 | 10/1943 | Vucassovich | 17/64 |
| 2,860,371 | 11/1958 | Krull | 17/64 |
| 3,766,605 | 10/1973 | Burns | 17/64 |
| 4,255,834 | 3/1981 | Lambert | 17/74 |
| 4,300,447 | 11/1981 | Hoover | 99/630 |

*Primary Examiner*—Willie G. Abercrombie
*Attorney, Agent, or Firm*—John J. Swartz

[57] ABSTRACT

Fish-scaling apparatus comprising a frame, a hollow elongate fish-scaling drum mounted on the frame, mechanism for rotating the fish-scaling drum, the fish-scaling drum including axially-spaced abrasive portions separated by relatively non-abrasive portions, whereby the scales of the fish will be intermittently abraded by the abrasive portions as the fish move axially downstream to remove the scales.

23 Claims, 5 Drawing Figures

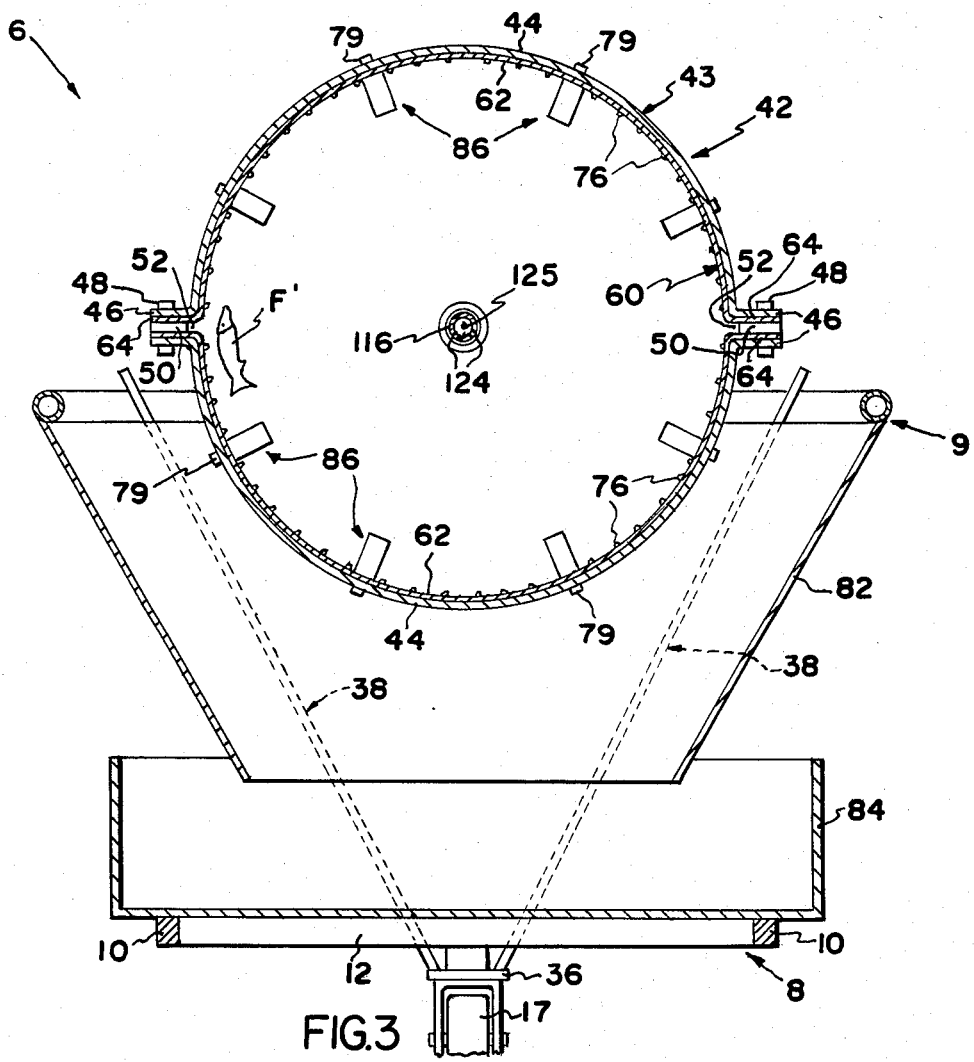
FIG.3
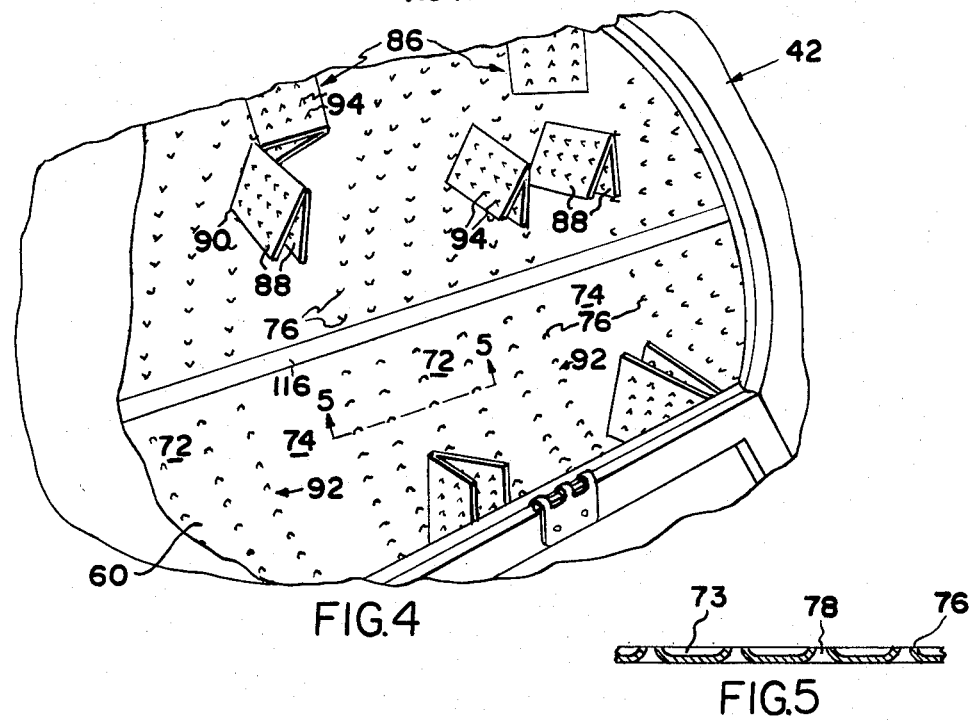
FIG.4
FIG.5

FISH SCALING APPARATUS

BACKGROUND OF THE INVENTION

1. Field of the Invention

This invention relates to fish scaling apparatus for removing the scales of a quantity of fish and, more particularly, to fish-scaling apparatus for scaling fish, including a rotatable, fish-receiving drum having an internal, helical, abrasive scaling strip for scaling a batch of fish.

2. Description of the Prior Art

Fish scalers have been provided heretofore, including rotatable mesh drums such as that disclosed in U.S. Pat. Nos. 2,331,855 and 2,355,405 issued to M. P. Vucassovich on Oct. 12, 1943 and Aug. 8, 1944 respectively; U.S. Pat. No. 3,766,605, issued to Lloyd G. Burns on Oct. 23, 1973; U.S. Pat. No. 3,304,574, issued to P. D. Ham, et al, on Feb. 21, 1967; and U.S. Pat. No. 2,860,371 issued to R. M. Krull on Nov. 18, 1958. The prior art fish-scaling devices typically include a mesh-type drum having a continuous cylindrical mesh which extends the full length and entire circumferential extent of the drum. One prior art scaling device comprises an upright washtub type fish-cleaning device which is not well suited for high volume scaling operations. Such continuous mesh drum scalers are not completely effective. Accordingly, it is an object of the present invention to provide fish-scaling apparatus which includes a fish-scaling drum including an internal surface comprising a helical fish scaling abrasive surface to remove scales. The abrasive strip will also aid in axially propelling fish thereon axially downstream.

As the drum is rotated, the fish will be partially rotated by the drum, and after being lifted or rotated through a portion of the revolution of the rotating drum, the fish will slide and tumble downwardly toward the lower end of the drum. It has been found that by elevating the fish-supply end relative to the opposite fish-discharge end, as the fish fall and tumble, they will more rapidly slide forwardly and will progressively move from the upstream end to the downstream end of the drum as it is being rotated and tumbled. By interspersing a smooth spiral strip with an abraded spiral strip, the fish, as they encounter a portion of the smooth spiral strip, will axially slide along the smooth spiral strip and, upon reaching a portion of the abrasive strip, will encounter resistance to axial movement and be "flipped over" so that the opposite side of the fish will be abraded by the abrasive strip portion which they contact.

Another object of the present invention is to provide fish-scaling apparatus including a rotatable fish-scaling drum including an internal surface provided with a smooth spiral strip and an adjacent denticulated spiral strip.

At least some of the prior art devices require an attendant to serially feed the fish to the machine. Another concern in processing fish is to insure the complete removal of scales, particularly from the bellies and backs. Accordingly, it is an object of the present invention to provide fish-scaling apparatus which will substantially remove all of the scales from a fish, including both sides, the belly and the back.

Another object of the present invention is to provide a plurality of circumferentially and axially staggered, perimetrically-disposed, radially inwardly extending paddles or wedge members which include axially-spaced abrading surfaces that converge in the direction of rotation. These paddles serve to reorient the fish, and the abrasive surfaces thereon serve to abrade the bellies and backs of the fish to enhance the cleaning thereof.

The denticulated spiral strip includes a plurality of small inwardly-disposed, spaced-apart projections. It has been found that, whereas projections of a predetermined length and spacing might serve to scale a fish of a particular size with particular scales, such projections optimally are of different length and spacing for another size fish with different size scales, for example. Accordingly, it is an object of the present invention to provide a drum-type fish-scaling device including a drum internally mounting a replaceable scale-removing shell comprising detachable semi-cylindrical shell segments, particularly adapted for scaling fish of a given size, which can be easily removed and replaced by another shell adapted to scale fish of a different size.

After a batch of fish have been scaled, it is desirable to rapidly remove the fish so that another batch of fish may be deposited in the drum for scaling. This is accomplished by lowering the discharge end of the fish-scaling drum so that the fish will more rapidly slide toward a discharge opening provided thereon. It is another object of the present invention to provide new and novel frame mechanism for swingably mounting the drum-type scaling apparatus on the main frame, and mechanism selectively swinging the apparatus to any one of a plurality of different positions.

It is yet another object of the present invention to provide a fish scaling apparatus of the type described, including new and novel apparatus for removal of the dislodged scales.

Other objects and advantages of the present invention will become apparent to those of ordinary skill in the art as the description thereof proceeds.

SUMMARY OF THE INVENTION

Fish scaling apparatus comprising a hollow elongate fish-scaling drum rotatably mounted on a frame, a hollow cylindrical drum rotatably mounted on the frame, including an abrasive spiral strip, for abrading and removing the scales of the fish as the drum is rotated, and the other of the strips being relatively smooth and non-abrasive.

BRIEF DESCRIPTION OF THE DRAWINGS

These and other objects of the present invention may more readily be understood by reference to the accompanying drawings.

FIG. 3 is a sectional end view, taken along the line 3—3 of FIG. 1.

FIG. 4 is a fragmentary, enlarged, perspective view more particularly illustrating the internal surface of the fish-scaling drum; and FIG. 5 is a sectional view, taken along the line 5—5 of FIG. 4.

DESCRIPTION OF THE PREFERRED EMBODIMENT

Figure 1:
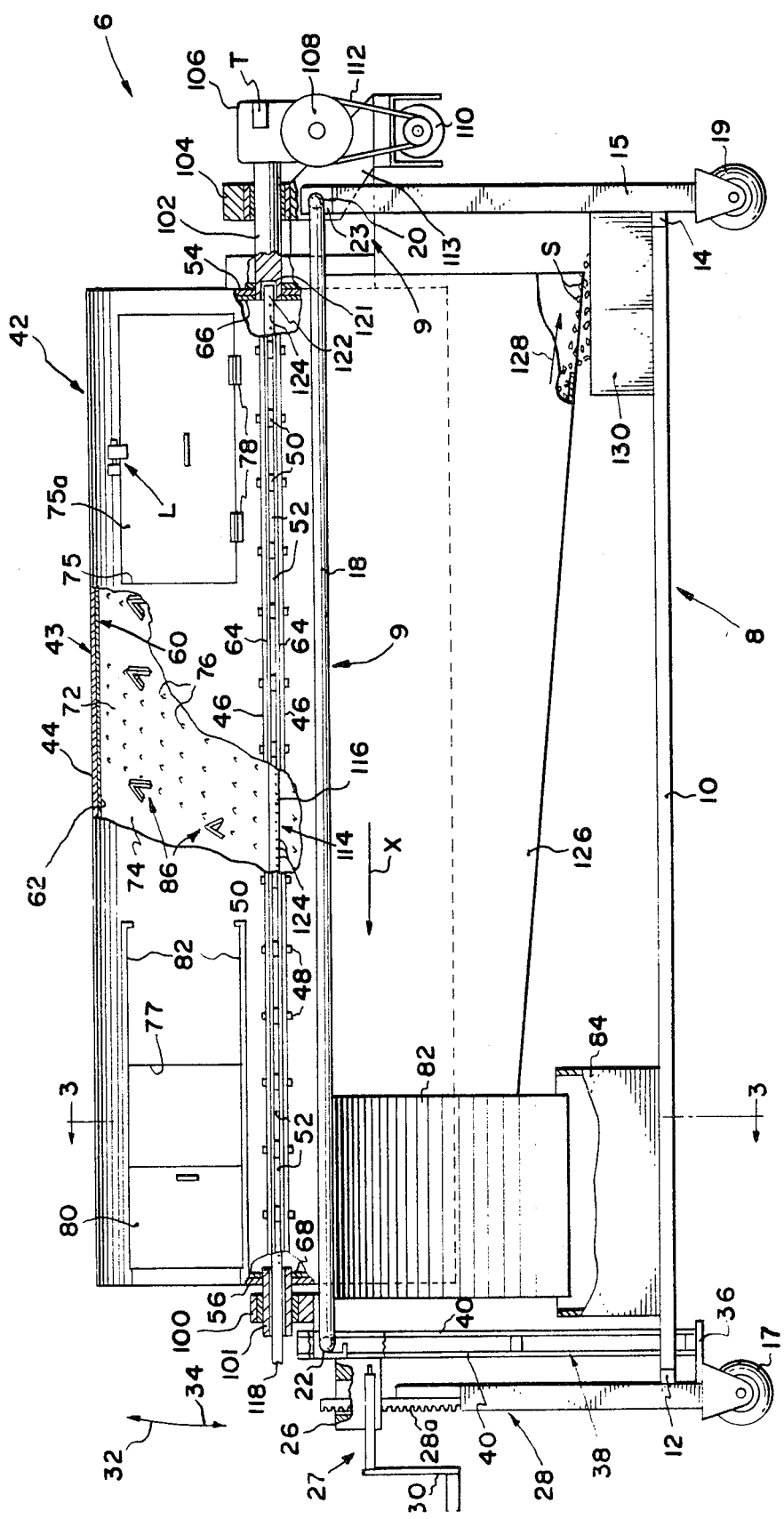
FIG. 1 is a side elevational view of apparatus constructed according to the present invention, parts of the apparatus being broken away to more particularly show the mounting apparatus and internal portions of the drum.
Figure 2:
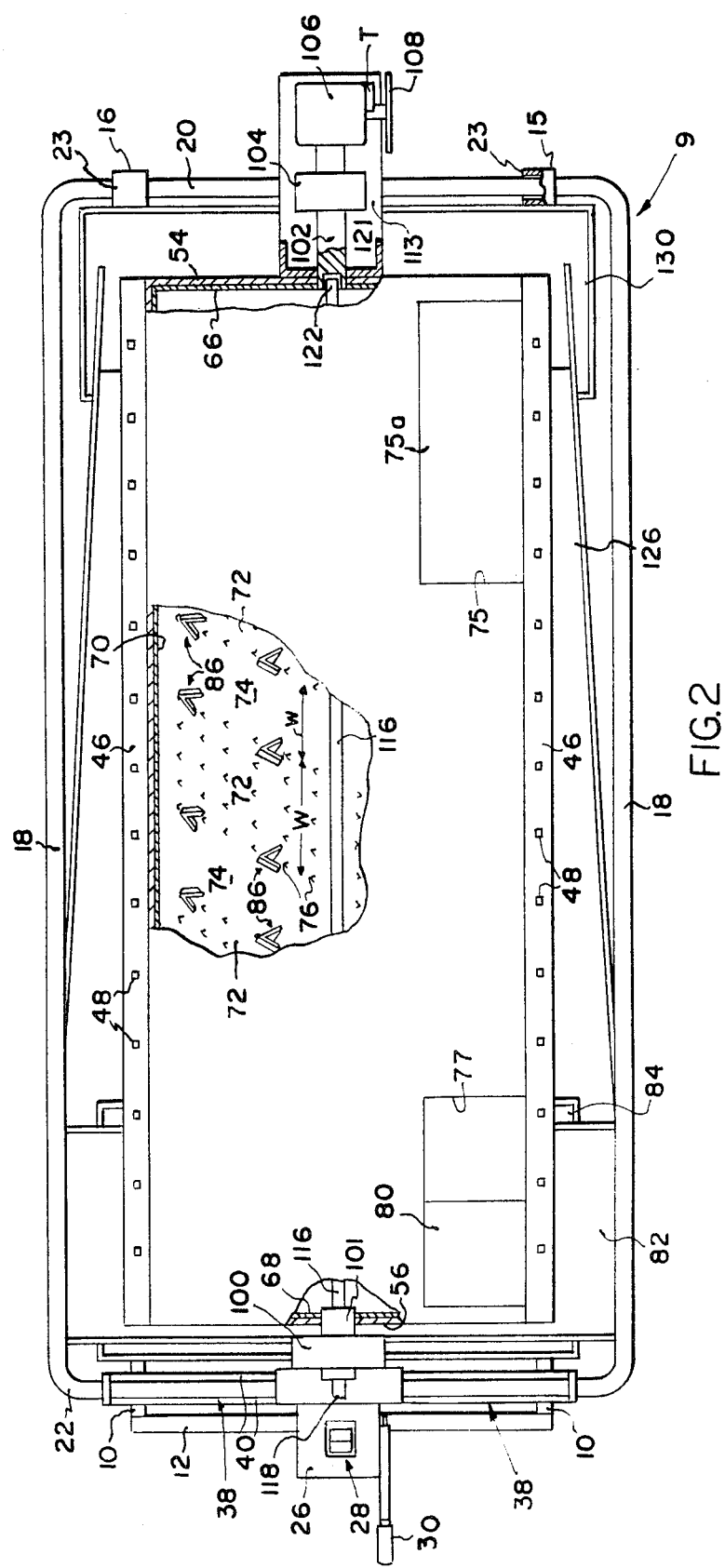
FIG. 2 is a top plan view of apparatus constructed according to the present invention, portions of the fish-scaling drum being broken away to more particularly illustrate underlying portions thereof.

Apparatus constructed according to the present invention, generally designated 6, includes a portable rectangular frame, generally designated 8, having a pair of longitudinally extending side rails 10 spanned by end rails 12 and 14, fixed at their forward ends to upstanding corner posts 15 and 16. The frame 8 is supported by a single pivot wheel 17 and two forward caster wheels 19 mounted on the end rails 12 and 14, respectively, as usual.

A vertically juxtaposed, rectangular sub-frame, generally designated 9, is mounted on the main frame 8 and includes a pair of longitudinally extending tubular side rails 18 spanned by tubular end rails 20 and 22. The tubular end frame rail 20 is journalled for swinging movement in bearing blocks 23 provided at the upper ends of posts 15 and 16 to swingably mount the sub-frame 9 for vertical swinging movement about the axis of tubular end rail 20.

A jack, generally designated 27, is provided for swinging the sub-frame 9 relative to the main frame 8. The jack 27 is of the type typically utilized on camper trailers and will not be described in detail. Suffice it to say that the jack includes an upstanding, toothed male jack member 28, welded or otherwise suitably secured to the main frame end member 12, movably received by a housing portion 26 which is fixed to the opposite end frame member 22. The housing 26 internally mounts a plurality of gears (not shown) drivingly engaging teeth 28a of jack member 28, actuated by a hand crank 30. Depending on the direction of rotation, the sub-frame 9 is swung upwardly and downwardly, in the directions of the arrows 32 and 34, about the axis of main frame member 20.

Extending upwardly from a plate 36, welded or otherwise suitably secured to the downstream end frame member 12, is a pair of upwardly, laterally outwardly diverging guide members, generally designated 38, each including a pair of axially spaced guide bars 40 which receive the tubular downstream end frame member 22 of the upper sub-frame 9 for vertically guiding the sub-frame 9 and inhibiting axial movement thereof.

A generally horizontally-disposed fish-scaling drum, generally designated 42, is journalled for rotation on the sub-frame 9 and includes an outer, generally cylindrical cage 43 and an inner detachable, generally cylindrical fish-scaling shell or lining 60. The outer cylindrical cage 43 comprises a pair of semi-cylindrical, imperforate outer cage members 44 having diametrically-opposed confronting radial flanges 46 which are coupled together via suitable nuts and bolts, generally designated 48. The drum cage 43 may suitably comprise chrome.

The hollow detachable cylindrical fish-scaling shell or lining, generally designated 60, includes a pair of semi-cylindrical shell members 62 which may suitably comprise rolled stainless steel, tin, or sheet metal, having confronting flange members 64 which are sandwiched between the cage flange members 48. The cage flanges 46 and shell flanges 48 are spaced apart via a plurality of axially-spaced spacers 50, to provide diametrically opposed radially-extending fish scale egress gaps or slots 52. The opposite ends of drum 42 are closed by cylindrical imperforate end members 54 and 56. The shell 62 includes cylindrical end frame members 66 and 68 lining the internal surface of drum end members 54 and 56 respectively.

The radial thickness of the internal shell members 62 is substantially less than the radial thickness of the outer cage members 43. Accordingly, the cost of the shell 60 is substantially less than the cost of the cage 43. Thus, the owner can have a plurality of different shells 60 which can be easily interchanged without incurring substantial costs.

A spiral strip portion 72 of the shell 62 is denticulated and includes a plurality of denticulations 73, providing an abrasive surface, including raised portions 76 (FIG. 5) formed by a punch or the like, having openings 78 at the terminal ends thereof. The end walls 66 and 68 of the internal scaling shell 60 likewisely include denticular projections, identical to the projection 76 illustrated in FIG. 5, to abrade the scales of any fish F coming in contact therewith. The scaling shell 62 thus includes a pair of axially adjacent, abutting, spiral or helical strips 72 and 74. The internal surface 70 of spiral strip 74 is substantially smooth, continuous and uninterrupted, and this allows the fish F to axially slide therealong with relatively little resistance to movement.

The drum 42 includes a fish supply opening 75 at the upstream end thereof, through which a quantity of fish F to be scaled is supplied. The opening 75 is closed by a door 75a, swingably mounted on one of the semi-cylindrical cage members 44 via hinges 78 and is held in the closed position via a latch, generally designated L. The door 75a includes radially aligned complimental portions of the internal shell 62 and outer cage 43, but which complete the outer cage 43 and shell 62 in the closed position.

Provided at the downstream end of the drum 42 is a discharge opening 77 to permit fish F' which have been scaled to be received by an underlying chute 82, which guides the scaled fish F' to an underlying fish box 84. The discharge opening 77 is closed via a door, generally designated 80, slidably mounted in guides 82 provided on the cylindrical cage 43.

Mounted on the interior surface of the scaling shell 60, via bolts 79 passing through apertures in the drum 42, is a plurality of circumferentially and axially staggered, fish separating and reorienting wedge members, generally designated 86, each including a pair of paddle members 88 which converge toward a lead edge 90, in the direction of rotation of the drum 42. The lead edge 90 of wedge members 86 is positioned at the junction 92 of the abrasive spiral strip 72 and the non-abrasive spiral strip 74. It should be noted in the drawing that the axial width W of the abraded strips 72 is substantially greater than the axial width w of the non-abrasive strips 74. The paddle members 88 include axial projections 94 which are identical to the projections 76 illustrated in FIG. 5. The paddle members 88 function to reorient the fish F to positions transverse to the drum axis, and the projections 94 thereon penetrate between the scales of the fish F along the bellies and backs of the fish F and shuffle and agitate the fish F as they pass through the drum.

The smooth, uninterrupted surface portion 70 of spiral strip 74 permits the fish F to axially slide; however, upon reaching the rough or abrasive spiral strips 72, the fish F are caused to flip over so that the other side of the fish is abraded as it slides axially over the abraded spiral strip 72.

The downstream end wall 56 of drum 42 is fixed to a hollow stub shaft 101 which is journalled in a bearing block 100 mounted on the sub-frame end member 22, whereas the opposite downstream end wall 54 is fixed to a drive shaft 102, journalled in a bearing block 104, which is mounted on the sub-frame end member 20. The drive shaft 102 is coupled to a reduction gear box 106, which is driven by a pulley 108, coupled to an electric drive motor or the like 110 via an endless drive belt 112. The motor 110 and gear box 106 is mounted on the sub-frame 9 via a bracket, generally designated 113, for swinging movement therewith. A suitable timer T may be provided for disconnecting power to motor 110 at selected intervals.

A water supply system, generally designated 114, is provided for supplying a wetting agent and cleaning agent for the fish F, as well as a carrier for the detached scales S, and includes a water supply tube 116 which is received by the stub shaft 101 and is coupled at one end 118 to a source of pressurized water. The opposite water supply tube end 121, which is closed, is rotatably received in an axial recess 122 provided in the inner end of the drive shaft 102. The pipe 116 includes a plurality of axially and horizontally spaced, radially outwardly extending openings 124 to permit the water therein to pass to the interior of the drum to wash and wet the fish F as they pass through the drum. A suitable valve (not shown) may be provided on the water supply pipe 116 to control the rate of flow of water therethrough as desired, or to completely shut off the water as needed. The water also serves to wash and remove the scales S through the diametrically opposed gaps 52 provided between the cylindrical drum halves.

The horizontal axis 125 of the drum 42 will typically be inclined downwardly forwardly in a downstream direction, as illustrated in FIG. 1, so that the fish F, as they are rotated, will be carried upwardly a few inches to approximately the position illustrated at F' in FIG. 3. The fish will then fall downwardly under the force of gravity. As the fish slip and fall, the force of gravity will tend to move them forwardly along the inclined internal surface of the scaling shell 60. The abraded surface on the spiral strip 72 will also tend to move the fish F in a spiral, downstream path of travel.

A scale receiving trough, generally designated 126, underlies the drum 42 and receives the detached scales S and water as they pass through the diametrically opposed gaps 52. The detached fish scales S and wash water will pass along the trough 126 in an axially opposite, radially-downwardly direction, represented by the arrow 128, to a fish-scale box, generally designated 130, provided at the upstream end of the machine. Accordingly, as the fish F are moved in an axially downstream direction, represented by the arrow X, the detached scales S will move in an axially opposite direction, represented by the arrows 128.

The discharge end of the drum may be lowered after the fish have been cleaned and the door 80 opened so that the quantity of fish cleaned may be rapidly deposited into the fish box 84.

It should be noted that the internal scaling shell 62 can easily be replaced by another shell by merely removing one of the semi-cylindrical cage members 44, removing the shell halves 62, and installing another pair of cylindrical shells 72 having projections 78 of different height and spacing, along with different size openings 78. The removed cage member 44 is then replaced.

THE OPERATION

In operation, a supply of fish F to be cleaned are supplied to the interior of the drum 42 via the supply door 76. The motor 110 is operated to rotate the drum 42, including the internal cylindrical lining 60. As the drum 42 is rotated, the fish F will bear against the interior surface of the shell 60 and will be carried thereby or rotated thereby through a portion of each revolution. The denticulated spiral scaling strip 72 will tend to move the fish F forwardly as the drum is rotated. The fish F will move vertically a few inches to the position such as illustrated at F' in FIG. 3. At this point, the fish F will slide and fall downwardly. As they fall downwardly, they will axially move forwardly. As the fish engage the denticulated spiral strip 72, the projections 78 will tend to penetrate between the scales of the fish and, as the fish are moved, the scales will be abraded from the body of the fish. When the fish F engage the smooth spiral strips 74, they will merely slide axially downstream in the direction of the arrow X. When the fish F engage the next axial portion of the spiral strip 72, however, they will flip over so that the opposite side of the fish is scaled.

When a fish F engages a wedge member 86, it will be turned and reoriented generally in a direction transverse to the drum axis, and the belly and/or back of the fish will be abraded by the projections 94 of the paddle members 88. The water provided through supply tube 116 will wash and carry the scales S through the gaps 52 to the trough 125, which will direct the scales to the fish scale box 130. After the fish F have passed the entire length of the machine, the operator need only turn the hand crank 30 to lower the downstream discharge end of frame F', open the door 86, and permit the cleaned fish F to be deposited into the chute 82 for passage to the fish box 84.

The discharge end of sub-frame F' and drum 42 is then elevated, the door 80 closed, and another supply of fish F provided through the supply door opening 75. Accordingly, it is clear that one operator can load, clean and unload the fish and can be attending to other work-related duties during the actual cleaning operation.

It is to be understood that the drawings and descriptive matters are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:
1. Fish-scaling apparatus comprising:
    a frame;
    a hollow elongate fish-scaling drum, rotatably mounted on said frame, including a fish supply upstream end for receiving unscaled fish and a fish discharge downstream end for discharging scaled fish;
    means for rotating said fish-scaling drum, thereby causing the fish disposed therein to upwardly rotate therewith until the force of gravity interrupts such movement whereby the fish tumble downwardly and move axially downstream;
    said drum including axially-spaced abrasive portions separated by relatively non-abrasive portions, whereby the scales of the fish will be intermittently abraded by the abrasive portions as the fish move axially downstream to remove the scales; and
    a plurality of circumferentially and axially spaced wedge members projecting radially inwardly from said drum for reorienting the fish.
2. The apparatus set forth in claim 1 wherein said wedge members include a plurality of sharp projections thereon for abrading the scales of the fish which come in contact therewith.

3. The apparatus set forth in claim 1 wherein said drum includes an outer hollow cylindrical cage and an inner hollow cylindrical scaling shell mounted therein for movement therewith; said scaling shell including a plurality of spirally arranged projections which comprise said abrasive portions.

4. The apparatus set forth in claim 3 including means for mounting said drum on said frame for swinging movement about said discharge end, and means for raising and lowering said supply end of said drum relative to said discharge end to control the axial rate of movement of said fish through said drum.

5. The apparatus set forth in claim 3 wherein said scaling shell includes alternately disposed adjacent spiral scaling strips, one of said strips having a relatively smooth surface comprising said non-abrasive portion, permitting said fish to freely slide; the other of said strips having a plurality of radially inwardly extending projections, having apertures at the terminal end thereof, comprising said abrasive portion.

6. The apparatus set forth in claim 5 including a plurality of circumferentially and axially staggered, radially inwardly-projecting wedge members mounted on the interior surface of said shell at the junction of said spiral strips.

7. The apparatus set forth in claim 3 wherein said scaling shell comprises a plurality of circumferentially abutting arcuate segments detachably coupled together.

8. The apparatus set forth in claim 2 wherein said wedge members include axially-spaced wedge surfaces which converge in the direction of rotation of said drum.

9. The apparatus set forth in claim 3 wherein said drum comprises arcuate imperforate segments coupled to adjacent ones of said segments but separated from the adjacent ones of said segments by gaps, which permit the detached fish scales to pass therethrough.

10. The apparatus set forth in claim 1 including means for supplying washing liquid to the inside of said drum.

11. The apparatus set forth in claim 10 wherein said liquid supply means comprises an axially-extending supply tube having one end coupled to a source of liquid and a plurality of radial openings therein internally of the drum for passing said liquid to the fish being scaled.

12. The apparatus set forth in claim 11 wherein the drum and said supply tube are coaxial; said drum being rotatably mounted on said supply tube for rotation relative thereto.

13. The apparatus set forth in claim 3 wherein said scaling shell includes a downstream end wall having a plurality of fish-scaling projections thereon for removing scales of fish coming in contact therewith.

14. The apparatus set forth in claim 5 wherein the axial width of said spiral strip of radially inwardly-projecting portions is substantially greater than the axial width of said spiral strip having said relatively non-abrasive surface.

15. The apparatus set forth in claim 14 wherein apertures are provided in said radially inwardly-projecting portions.

16. Fish-scaling apparatus comprising:
a frame;
a rotatable fish-scaling drum, mounted on said frame, having a fish supply end and an opposite fish discharge end;
means for rotating said drum such that fish are carried thereby for partial rotation and tumbled to move axially downstream under the force of gravity;
said drum including alternate helical strip portions, one of said helical strip portions having a plurality of radially inwardly projecting fish scale penetrating means thereon for abrading and removing the scales of fish therein and for axially moving the fish in a downstream path of travel, the other of said strip portions having a substantially continuous relatively non-abrasive surface; and
a plurality of circumferentially and axially spaced, radially inwardly-extending paddle members mounted on the inside of said drum for reorienting said fish.

17. The apparatus set forth in claim 16 wherein said paddle members comprise wedge members having axial side surfaces which converge in the direction of rotation of said drum.

18. The apparatus set forth in claim 17 wherein said axial side surfaces include fish scale penetrating projections thereon for removing said scales.

19. The fish-scaling apparatus set forth in claim 18 wherein said paddle members are disposed at the junction of said helical strips.

20. Fish-scaling apparatus comprising:
a frame;
a hollow cylindrical drum, rotatably mounted on said frame;
a fish-scaling cylindrical shell mounted on the inside of said drum, including arcuate shell sections coupled to each other; and
means for supplying a liquid wetting agent to the fish internally of said shell;
said cylindrical shell including an internal surface provided with a helically extending strip including a plurality of radially inwardly extending projections for abrading and removing the scales of said fish as the drum is rotated;
said drum including arcuate, imperforate outer cage members, coupled to adjacent ones of said arcuate cage members but separated from adjacent ones of said arcuate cage members by gaps which permit the detached fish scales to pass therethrough.

21. The apparatus set forth in claim 20 wherein said arcuate shell sections include radially outwardly extending flanges received by said gaps and sandwiched between the adjacent ends of adjacent ones of said outer cage members.

22. The apparatus set forth in claim 21 wherein said drum cage members each include axially extending, radially outwardly extending flange members circumferentially spaced from the adjacent flange members of the adjacent cage member, said radially outwardly extending flanges of said shell sections being coupled together and juxtaposed between said flange members of said cage members.

23. The apparatus set forth in claim 22 wherein the radial thickness of said shell sections is substantially less than the radial thickness of said cage members.

* * * * *